United States Patent
Veit et al.

(10) Patent No.: US 12,427,407 B2
(45) Date of Patent: Sep. 30, 2025

(54) LATENCY SENSITIVE PACKET TAGGING WITHIN A HOST VIRTUAL MACHINE

(71) Applicant: Microsoft Technology Licensing, LLC, Redmond, WA (US)

(72) Inventors: Darrin Alan Veit, Sammamish, WA (US); Douglas Scott Gallatin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 523 days.

(21) Appl. No.: 18/052,660

(22) Filed: Nov. 4, 2022

(65) Prior Publication Data

US 2024/0149154 A1    May 9, 2024

(51) Int. Cl.
| | | |
|---|---|---|
| *A63F 13/335* | (2014.01) | |
| *G06F 9/455* | (2018.01) | |
| *H04L 43/50* | (2022.01) | |
| *H04L 69/22* | (2022.01) | |
| *H04W 28/02* | (2009.01) | |

(52) U.S. Cl.
CPC ........ *A63F 13/335* (2014.09); *G06F 9/45558* (2013.01); *H04L 43/50* (2013.01); *H04L 69/22* (2013.01); *H04W 28/0268* (2013.01); *G06F 2009/45595* (2013.01)

(58) Field of Classification Search
CPC .. A63F 13/335; A63F 13/358; G06F 9/45558; G06F 2009/45595; H04L 43/50; H04L 69/22; H04L 41/40; H04L 41/5022; H04L 47/2433; H04L 43/028; H04L 47/2408; H04L 47/31; H04L 65/765;
(Continued)

(56) References Cited

U.S. PATENT DOCUMENTS

| 8,824,293 B2 | 9/2014 | Assarpour et al. |
| 8,930,566 B2 | 1/2015 | Davis et al. |

(Continued)

OTHER PUBLICATIONS

"Prioritizing Network Traffic", Retrieved From: https://jrazor247.wordpress.com/2010/09/29/prioritizing-network-traffic/, Sep. 29, 2010, 3 Pages.

(Continued)

*Primary Examiner* — Michael A Keller
(74) *Attorney, Agent, or Firm* — Holzer Patel Drennan (57) ABSTRACT

Game consoles utilize streamed content over a data network, such as multiplayer scenarios where disparately located players may interact with one another. Streamed interactions may be competing with other computing devices and associated software applications running in parallel. Such a competition for available bandwidth within may result in data congestion, which may in turn cause perceivable delays and/or jitter. However, some types of data are more susceptible to perceivable delays and/or jitter than other types of data. The presently disclosed technology distinguishes between types of streamed data content and tags the streamed data content according to a QoS metric. QoS packet tagging indicates a priority to handling the data within nodes and links of a data network. Further, the presently disclosed technology permits user configurable tagging settings that allow the user to customize tagging specific to their network environment.

20 Claims, 6 Drawing Sheets

(58) Field of Classification Search
CPC ... H04L 47/2416; H04L 65/80; H04L 67/131; H04W 28/0268
See application file for complete search history.

(56) References Cited

U.S. PATENT DOCUMENTS

| | | |
|---|---|---|
| 9,935,871 B2 | 4/2018 | Bastian et al. |
| 10,967,274 B1* | 4/2021 | Schuster ............... G06F 9/5083 |
| 11,350,307 B2 | 5/2022 | Boyapalle et al. |
| 2014/0006585 A1* | 1/2014 | Dunbar ............... H04L 12/4645 |
| | | 709/223 |
| 2022/0075638 A1* | 3/2022 | Shukla ................... G06N 3/04 |

OTHER PUBLICATIONS

Alshaer, Hamada, "An Overview of Network Virtualization and Cloud Network as a Service", In International Journal of Network Management, vol. 25, Issue 1, Jan. 2015, 30 Pages.

Asgari, et al., "Quality of Service (QOS) Packet Tagging on Xbox Consoles", Retrieved From: https://web.archive.org/web/20220921201401/https:/learn.microsoft.com/en-us/gaming/gdk/_content/gc/networking/overviews/qos-packet-tagging, Aug. 20, 2022, 2 Pages.

Teixeira, Virginia, "How Latency Meets its Match with Network Slicing", Retrieved From: https://blogs.cisco.com/sp/5g_network_slicing, Jul. 8, 2020, 7 Pages.

* cited by examiner

LATENCY SENSITIVE PACKET TAGGING WITHIN A HOST VIRTUAL MACHINE

BACKGROUND

Video game consoles (or game consoles), such as the Xbox® game console marketed by the Microsoft Corporation of Redmond, Wash., have widely proliferated and are found in many households. Traditionally, game consoles have been low-cost devices embodying specialized hardware for receiving user inputs and rendering audio and video outputs to the user. Further, game consoles have traditionally focused on entertainment scenarios in which most or all the content was found either in built-in storage, such as ROM/flash, or hard drives, or it was introduced on portable storage media such as DVDs or CDs. However, game consoles now increasingly utilize connected experiences (e.g., multiplayer gameplay or console streaming to a separate computing device, such as a mobile phone) over a data network, such as multiplayer scenarios where disparately located players may interact with one another over the Internet via the game console. This interaction may include audio and/or video conferencing, text chatting, and gameplay content, as examples, all of which may be streamed over the data network between game consoles.

SUMMARY

Implementations described and claimed herein provide a game console comprising memory, one or more processors, and a game console operating system (OS). The game console OS comprises a game virtual machine (VM) executable by the one or more processors, the game VM to generate and send a series of untagged game VM frames outbound to a virtual network; a system VM executable by the one or more processors, the system VM to generate and send a series of untagged system VM frames outbound to the virtual network; and a host VM executable by the one or more processors. The host VM receives the untagged game VM frames and untagged system VM frames inbound from the virtual network, selects a subset of one or both of the untagged game VM frames and the untagged system VM frames as latency-sensitive, regenerates the latency-sensitive data frames with a quality of service (QoS) header tag instructing priority handling of the latency-sensitive data frames to a connected data network, and sends the tagged latency-sensitive data frames outbound to the connected data network.

Implementations described and claimed herein further provide a method for tagging latency-sensitive packets generated within a game console operating system (OS). The method comprises generating and send a series of untagged game virtual machine (VM) frames outbound from a game VM to a virtual network within the game console OS, generating and send a series of untagged system VM frames outbound from a system VM to the virtual network within the game console OS, receiving the untagged game VM frames and untagged system VM frames inbound from the virtual network to a host VM within the game console OS, selecting a subset of one or both of the untagged game VM frames and the untagged system VM frames as latency-sensitive, regenerating the latency-sensitive data frames within the host VM with a quality of service (QoS) header tag instructing priority handling of the latency-sensitive data frames to a connected data network; and sending the tagged latency-sensitive data frames outbound from the game console OS to the connected data network.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

DETAILED DESCRIPTIONS

Streamed interactions via a game console may be competing with other computing devices and associated software applications running in parallel. The game consoles described in detail herein are one example of a computing device that is optimized to render gaming or other similar interactive applications that are run on the computing device or are run on a backend server (such as a cloud based server) or by a combination of the computing device and the backend server. Such a competition for available bandwidth within a user's home network and/or on a service provider network may result in data congestion, which may in turn may cause queued and/or dropped data packets. From a user perspective, this can cause perceivable delays and/or jitter. However, some types of data are more susceptible to perceivable delays and/or jitter than other types of data. For example, it is common for a user of a gaming application to experience network-related delays sufficient to negatively impact game play when gaming data frames are queued and/or dropped. In contrast, the user perception of streaming video content that is buffered may not be affected by frames that are queued and/or dropped so long as the buffer is sufficient to compensate for the queued and/or dropped data frames.

The presently disclosed technology distinguishes between types of streamed data content and tags the streamed data content accordingly to a quality of service (QoS) metric (e.g., latency targets). QoS packet tagging indicates a priority to handling the data over nodes and links of a data network (e.g., at an IP layer, at a Wi-Fi layer, and/or at a Ethernet layer). Further, the presently disclosed technology permits user configurable tagging settings that allow the user to customize tagging specific to their network environment (e.g., LAN or WAN). Still further, the QoS packet tagging disclosed herein is forward and backward compatible with gaming titles and other applications running on a game console as the QoS packet tagging may occur outside of a game VM and/or a system VM and instead within a host VM.

While discussed herein specifically referencing game consoles, a variety of other computing devices (e.g., laptop computers, personal computers, smart phones, smart TVs, wireless speakers, projectors, and microphones, and other devices that carry out one or more specific sets of arithmetic and/or logical operations) may utilize the latency-sensitive QoS packet tagging disclosed in detail herein.

Figure 1:
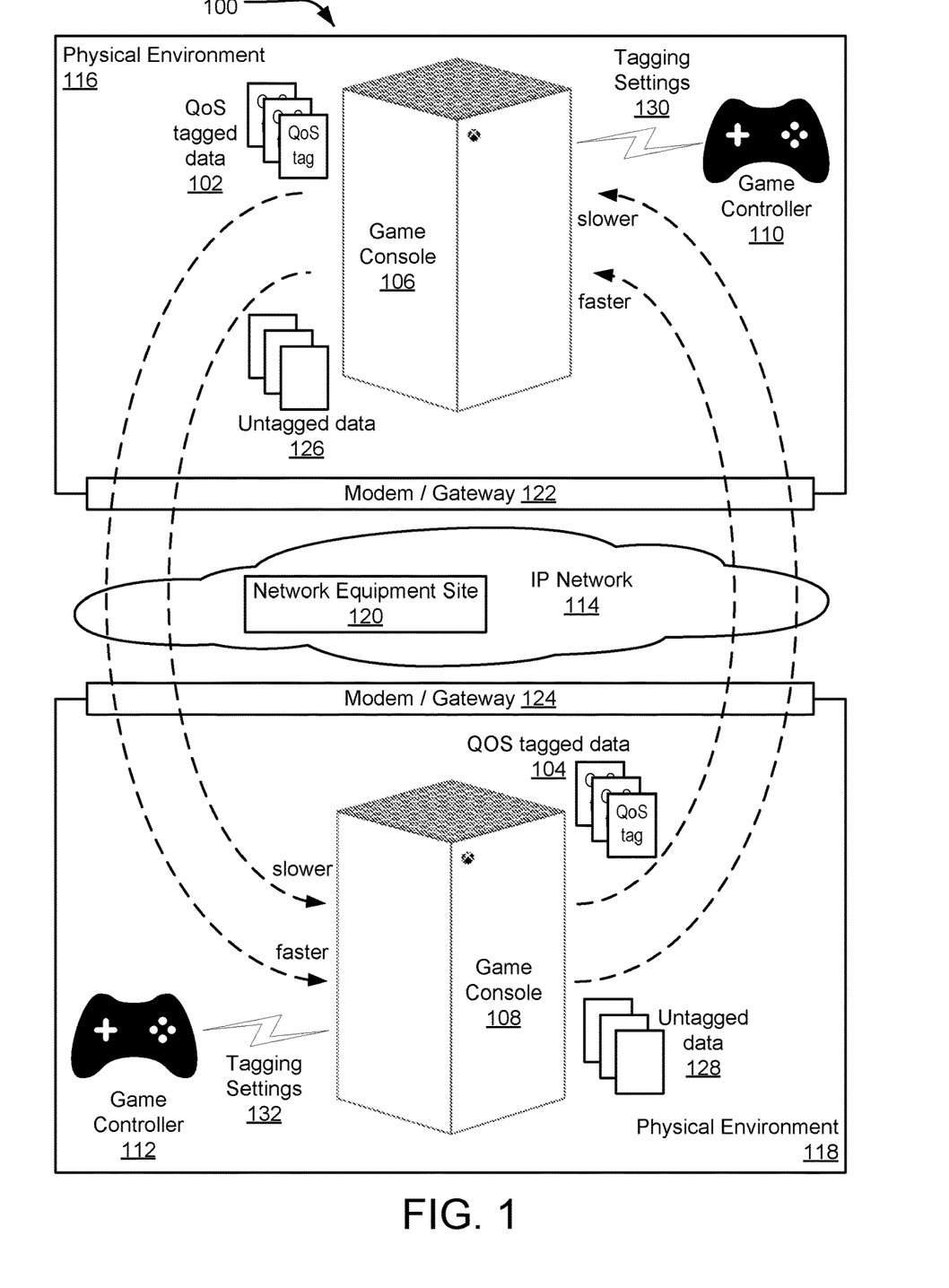
FIG. 1 illustrates an example computing network incorporating QoS packet tagging for latency-sensitive data flows.

FIG. 1 illustrates an example computing network 100 incorporating QoS packet tagging for latency-sensitive data flows (e.g., QoS tagged data 102, 104). The computing network 100 includes game consoles 106, 108 and associated game controllers 110, 112, each potentially residing within a local area network (LAN), a wide area network (WAN), and/or an Internet Protocol (IP) Network 114 (collectively (alone or in some combination) referred to herein, a data network). The game console 106 and associated game controller 110 are located in physical environment 116, while the game console 108 and associated game controller 112 are located in physical environment 118. The game consoles 106, 108 are connected (wired or wireless) via the IP Network 114.

In various implementations, the physical environments 116, 118 may each be a home, business, Internet café, or any other physical location where the game consoles 106, 108 may obtain access to Internet Protocol (IP) Network 114. Further, while the physical environments 116, 118 are depicted and treated separately, the physical environments 116, 118 may overlap within the same physical space, such as a home. While only two game consoles 106, 108 are explicitly illustrated and described with reference to FIG. 1, many more game consoles and corresponding game controllers and other peripherals (e.g., displays and other input devices) may be dispersed throughout one or more physical environments and function similarly to the game consoles 106, 108 and associated game controllers 110, 112.

The Internet Protocol (IP) Network 114 may be, or otherwise include, any type of information distribution network or combination of such networks, such as a satellite network, a landline telephone network, a cellular telephone/data network or other wireless network, the Internet, a wide-area network (WAN), a local-area network (LAN), etc. Further examples include an optical fiber network, a coaxial cable network or a hybrid fiber/coax (HFC) distribution network. Such networks may use a series of interconnected communication links (e.g., coaxial cables, optical fibers, hybrid fiber/coax, wireless links, etc.) to connect the physical environments 116, 118 to a network equipment site 120 (e.g., a network central office or headend). The network equipment site 120 may transmit downstream information signals onto the links, and each of the physical environments 116, 118 may have a receiver (e.g., modem/gateway 122, 124, respectively) used to receive and process those signals.

There may be one or more physical links, such as an electrically conductive line, originating from the network equipment site, and it may be split multiple times to distribute the signal to the physical environments 116, 118. The physical links may include components not illustrated, such as splitters, filters, amplifiers, etc. to help convey the signal clearly. Portions of the physical links may also be implemented with fiber-optic cable, such as part of a passive optical network (PON) and/or a hybrid-fiber coax network, while other portions may be implemented with coaxial cable, other lines, or wireless communication paths. The network equipment site 120 may further include a termination system (TS), such as a cable modem termination system (CMTS), which may be a computing device configured to manage communications between devices on the network of links (e.g., the game consoles 106, 108) and backend servers (not shown).

The physical environments 116, 118 may each be equipped with network access devices, such as modem/gateway devices 122, 124, respectively, each of which may include transmitters and receivers used to communicate over the physical links within the IP Network 114. Each of the modem/gateway devices 122, 124 may be incorporated as a singular unit, as shown, or may be separately provided within their respective physical environments 116, 118. For example, gateway devices may be or otherwise include computing devices that communicate with modems to allow the game consoles 106, 108 to each communicate within a respective local network (not shown, see e.g., local-area network (LAN) 236 of FIG. 2) and with other computing devices, such as other game consoles, beyond its respective LAN via the IP Network 114.

The gateway devices may each be or otherwise include, for example, a set-top box (STB), digital video recorder (DVR), computer server, router, or any other connected computing device. The gateway devices may further include LAN interfaces to route and/or otherwise provide communication signals to/from the game consoles 106, 108 and other computing devices connected within a LAN (e.g., televisions, STBs, personal computers, laptops, tablet computers, mobile phones, personal digital assistants (PDAs), voice-over-IP (VoIP) phones, and any other computing devices) within their respective physical environments 116, 118. Examples of the LAN interfaces include Multimedia Over Coax Alliance (MoCA) interfaces, Ethernet interfaces, universal serial bus (USB) interfaces, wireless interfaces (e.g., IEEE 802.11n (or later)), Bluetooth interfaces, and others.

The game console 106 generates a variety of outbound data traffic types and receives a variety of inbound data traffic types. These data traffic types include, for example gaming data, videoconferencing data, voice-only data, text data, bulk transfers, and game console metrics. Some of the outbound data traffic is more sensitive to delays caused by data congestion and resulting queuing and/or drops of data packets. Other outbound data traffic is less sensitive to such delays caused by data congestion. For example, gaming data may be considered the most susceptible to data congestion delays as even small delays may cause noticeable jitter, latency, or lag in gameplay. Videoconferencing data and/or voice-only data (e.g., data that represents sound such as the human voice, such as VoIP data) may also be considered highly susceptible to data congestion delays as even small delays may cause delays that cause interference with conversation between humans.

In contrast, text data is less susceptible to data congestion delays as a text-only conversation between humans is already delayed by virtue of human typing delay and a further delay between the typing delay may not be noticeable or problematic. Similarly, bulk transfers may be buffered, and game console metrics may not be overtly monitored by a user. Thus, data congestion delays in transmitting these types of data are less or not at all noticeable by the user or problematic to the user.

Prioritizing data traffic that is more sensitive to delays caused by data congestion and de-prioritizing data traffic that is less sensitive to delays caused by data congestion may be considered a quality of service (QoS) improvement to the user. The presently disclosed technology utilizes data header tagging to communicate within the computing network 100 that some data is to be prioritized and/or other data is to be de-prioritized.

In some implementations, the game console 106 marks outgoing data packets (e.g., organized as Ethernet, Wi-Fi, or IP frames) as containing prioritized data by utilizing a packet header field pursuant to wireless multimedia (WMM) and/or differentiated services code point (DSCP) standards (illustrated as QoS tagged data 102). When WMM tagging is enabled, the game console 106 will set QoS tags on outbound data packets using a preferred user datagram protocol (UDP) multiplayer port and configure those data packets with a WMM value of 6 or AC_VO, per the IEEE 802.11e (or later) standard. These traffic classifications are typically used for voice network traffic, which is generally considered the most latency-sensitive data traffic outside the gaming space.

When DSCP tagging is enabled, the game console 106 will set QoS tags on outbound data packets using the preferred UDP multiplayer port and will configure those data packets with a DSCP value of 46 for both IPv4 and IPv6 packet types. These traffic classifications are typically associated with the "Expedited Forwarding" (EF) per-hop behavior (PHB) and are also typically used for voice network traffic outside the gaming space. In the gaming space, WMM and/or DSCP tags may be used for gaming traffic or other prioritized traffic, as well as voice network traffic.

It follows that a lack of WMM and/or DSCP tags in outbound data packets (illustrated as untagged data 126) indicates that the data packets do not contain prioritized data and thus may be de-prioritized. The game console 108 may similarly set WMM and/or DSCP tags on some data packets (illustrated as QoS tagged data 104) but not on other data packets (illustrated as untagged data 128), based on optimizing overall QoS for the user. While WMM and DSCP tags are explicitly disclosed and described for data prioritization and lack thereof for data de-prioritization, other mechanisms for tagging data packets for prioritization and/or de-prioritization are contemplated herein.

Some of the QoS tagged data 102 and the untagged data 126 is to be sent from the game console 106 to the game console 108 via the IP network 114. The QoS tagging indicates to computing nodes and links within the IP network 114 and LANs within the physical environments 116, 118 (if present) that the QoS tagged data 102 is to be prioritized over the untagged data 126. This results in less queueing and fewer drops of the QoS tagged data 102 as compared to the untagged data 126. As a result, the QoS tagged data 102 flows faster from the game console 106 to the game console 108 than the untagged data 126, as illustrated. Similarly, some of the QoS tagged data 102 and the untagged data 126 is to be sent from the game console 106 to other destinations within or via the IP network 114. The QoS tagged data 102 will similarly flow faster from the game console 106 to the other destinations than the untagged data 126.

It follows that some of the QoS tagged data 104 and the untagged data 128 is to be sent from the game console 108 to the game console 106 via the IP network 114. As a result, the QoS tagged data 104 flows faster from the game console 108 to the game console 106 than the untagged data 128, as illustrated. Similarly, some of the QoS tagged data 104 and the untagged data 128 is to be sent from the game console 108 to other destinations within or via the IP network 114. The QoS tagged data 104 will similarly flow faster from the game console 108 to the other destinations than the untagged data 128. While the foregoing assumes a binary tagging selection (QoS tagged or not) for outbound data, other implementations may adopt more priority options for a more granular solution (e.g., 3 or more levels of priority).

In some implementations, the WMM and/or DSCP tagging may be user configurable. For example, a user may interact with the game console 106 via the game controller 110 and use the game controller 110 to access and configure tagging settings 130 for the game console 106. In an example implementation, the user may be able to select between no QoS tagging, WMM only QoS tagging, DSCP only QoS tagging, and both WMM and DSCP tagging. Other implementations may utilize fewer options (e.g., only one available type of tagging) or a greater number of options (e.g., if additional tagging methods beyond WMM/DSCP are available). Similarly, a user may interact with the game console 108 via the game controller 112 and use the game controller 112 to access and configure tagging settings 132 for the game console 106.

In various implementations, the specific nodes and links that the game consoles 106, 108 utilize may behave differently depending on the user configurable QoS tagging setting. This allows the user to experiment with different settings to achieve the best QoS possible for the specific connected nodes and links for each of the game consoles 106, 108.

The tagging behavior disclosed herein is not exclusive to games that connect directly between peer consoles (e.g., game consoles 106, 108) in a peer-to-peer (P2P) networking environment. In other implementations, the game console 106 may be considered one of many connected game consoles and the game console 108 may be considered a game server. In such a scenario, FIG. 1 illustrates a client-server networking environment.

Figure 2:
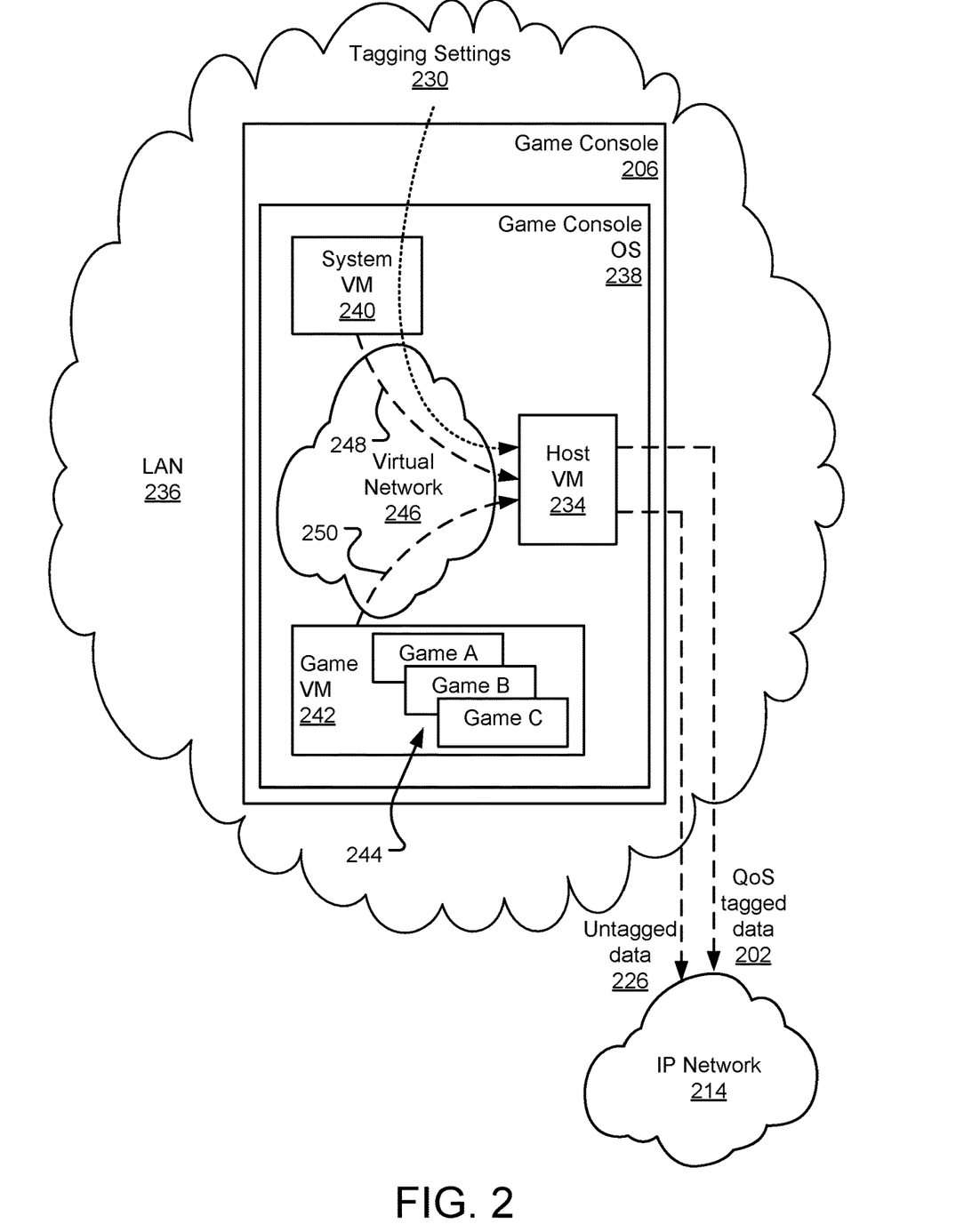
FIG. 2 illustrates an example game console adopting QoS packet tagging for latency-sensitive data flows outbound from a host virtual machine.

FIG. 2 illustrates an example game console 206 adopting QoS packet tagging for latency-sensitive data flows outbound from a host virtual machine 234. The game console 206 resides within a LAN 236 and is communicatively coupled (wired or wireless) to IP Network 214. While only one game console 206 is explicitly illustrated and described with reference to FIG. 2, many more game consoles may be interconnected via one or both of the LAN 236 and the IP Network 214 and function similarly to the game console 206. Various features of the IP Network 214 and LAN 236 may be as described above with reference to IP Network 114, modem/gateway devices 122, 124, and associated LANs of FIG. 1.

A game console operating system (OS) 238 stored in memory (not shown, see e.g., memory 404 of FIG. 4) and executed using one or more processors (not shown, see e.g., processors 402 of FIG. 4) controls operation of the game console 206. As the game console 206 is a specialized computing device, it runs several virtual machines (VMs) (e.g., the Host VM 234, a System VM 240, and a Game VM 242), each of which handles different operational areas of the game console 206, but when combined makes the VMs 234, 240, 242 appear as one OS 238 to the LAN 236 and the IP Network 214.

The System VM 240 provides the main visual and interactive layer of the game console 206 to the user. The System VM 240 may contain the core elements of the game console 206 user interface, such as Home and Guide in various implementations of the Xbox® game console. The System VM 240 is also the environment in which Store applications are installed and operate, enabling purchase and/or download of games, video, music, and other digital content. The System VM 240 may also be where cross environment applications are run, such as Party Chat in various implementations of the Xbox® game console, which can operate while a game is active, as well as when the System VM 240 is the primary active user interface. As further examples, the user may be able to select games, participate in chat, download games and updates, and configure settings (e.g., select tagging settings 230, discussed in further detail below) that are applicable to the entire game console 206 via a user interface with the System VM 240.

The Game VM 242 is used exclusively to run a selected gaming title (e.g., one of Games A, B, and C 244. Specifically, the user may select a desired gaming title via the System VM 240, which triggers the Game VM 242 to boot and run the selected gaming title. In various implementations, the Game VM 242 may be capable of running both current generation titles (e.g., titles launched on Xbox® Series S|X), as well as prior generation games (e.g., titles launched on Xbox® One, Xbox® 360, or the original Xbox®). Once running, the Game VM 242 may take inputs directly from the user into the Game VM 242 to play the selected gaming title. The Game VM 242 may also include a dedicated videoconferencing, audioconferencing, or text chat function as a part of online gameplay.

The Host VM 234 is the primary OS for the game console 206 and is responsible for managing the other VMs (e.g., the System VM 240 and the Game VM 242), providing drivers for hardware components, applying QoS tagging, and so on. More specifically, the Host VM 234 provides hardware drivers used to interface with physical wired and wireless network adapters for the game console 206. The Host VM 234 is also responsible for multiplexing network traffic to and from the Game VM 242 and the System VM 240. This allows the game console 206 to share a single external IP address on a single physical network adapter across multiple virtual machines (e.g., the Host VM 234, the System VM 240, and the Game VM 242). This also allows priority network traffic, such as text chat from the System VM 240, remote console streaming, and game/chat traffic from the Game VM 242 to share a single, preferred UDP port on the network interface.

In order to function together, the System VM 240 and the Game VM 242 each treat outbound/inbound data as communicated over a virtual network 246 to/from the Host VM 234. As the VMs 234, 240, 242 are all running on the same hardware set, the virtual network 246 is merely an internal communication protocol that formats outbound/inbound data packets as if they were being transmitted over an actual communication network between the System VM 240/Game VM 242 and the Host VM 234.

The System VM 240 generates outbound data traffic 248, which may include a variety of data types, such as text data, bulk data transfers, and game console metrics. Some of the outbound System VM 240 data traffic may be more sensitive to delays caused by data congestion and resulting queuing and/or drops of data packets than other System VM 240 data traffic. However, all outbound System VM 240 data traffic is sent out over the virtual network 246 to the Host VM 234 for further handling.

The Game VM 242 generates outbound data traffic 250, which may also include a variety of data types, such as gaming data, videoconferencing data, voice-only data, and text data. Some of the outbound Game VM 242 data traffic may be more sensitive to delays caused by data congestion and resulting queuing and/or drops of data packets than other Game VM 242 data traffic. However, all outbound Game VM 242 data traffic is also sent out over the virtual network 246 to the Host VM 234 for further handling.

Prioritizing data traffic that is more sensitive to delays caused by data congestion and de-prioritizing data traffic that is less sensitive to delays caused by data congestion may be considered a quality of service (QoS) improvement to a user of the game console 206. For example, gaming data outbound from the Game VM 242 may be considered the most susceptible to data congestion delays as even small delays may cause noticeable jitter, latency, or lag in gameplay. Videoconferencing data and/or voice-only data (e.g., data that represents sound such as the human voice, such as VoIP data) also outbound from the Game VM 242 may also be considered highly susceptible to data congestion delays as even small delays may cause delays that caused interference with conversation between humans.

In contrast, text data outbound from the Game VM 242 and/or the System VM 240 is less susceptible to data congestion delays as a text-only conversation between humans is already delayed by virtue of human typing delay and a further delay between the typing delay may not be noticeable or problematic. Similarly, bulk data transfers outbound from the System VM 240 may be buffered, and game console metrics outbound from the System VM 240 may not be overtly monitored by a user. Thus, data congestion delays in transmitting these types of data are less or not at all noticeable by the user or problematic to the user.

The Host VM 234 utilizes QoS header tagging communicates to various nodes and links within the LAN 236 and/or the IP Network 214 that data frames are to be prioritized and/or de-prioritized. Specifically, the Host VM 234 regenerates the data frames incoming from the Game VM 242 and/or the System VM 240, some including QoS header tagging indicating that those outgoing data packets (organized as Ethernet frames) contain prioritized data. The QoS header tagging may utilize a packet header field pursuant to wireless multimedia (WMM) and/or differentiated services code point (DSCP) standards (illustrated as QoS tagged data 202). The WMM and/or DSCP tags may be used for gaming traffic or other prioritized traffic, as well as voice network traffic, for example.

It follows that a lack of WMM and/or DSCP tags in outbound data packets from the Host VM 234 (illustrated as untagged data 226) indicates that the data packets do not contain prioritized data and thus may be de-prioritized. While not shown, inbound data packets may include similar QoS header tagging, or a lack thereof, to indicate such data frames are to be prioritized and/or de-prioritized in their communication to the game console 206 from another game console or elsewhere over the LAN 236 and/or IP Network 214. While WMM and DSCP tags are explicitly disclosed and described for data prioritization and lack thereof for data de-prioritization, other mechanisms for tagging data packets for prioritization and/or de-prioritization are contemplated herein.

The QoS tagging indicates to computing nodes and links within the LAN 236 and the IP network 214 that the QoS tagged data 202 is to be prioritized over the untagged data 226. This results in less queueing and fewer drops of the QoS tagged data 202 as compared to the untagged data 226. As a result, the QoS tagged data 202 flows faster outbound from the game console 206 to its destination than the untagged data 226, all else being equal.

In some implementations, the QoS tagging may be user configurable. For example, a user may interact with the game console 206 via a game controller (not shown) and use the game controller to access and configure tagging settings 230 for the game console 206 within the System VM 240 user interface. The user's selected tagging settings 230 configuration flows from the System VM 240 to the Host VM 234 to affect how the Host VM 234 implements QoS tagging, if at all. In an example implementation, the user may be able to select between no QoS tagging, WMM only QoS tagging, DSCP only QoS tagging, and both WMM and DSCP tagging. Other implementations may utilize fewer options (e.g., only one available type of tagging) or a greater number of options (e.g., if additional tagging methods beyond WMM/DSCP are available).

In various implementations, the specific nodes and links that the game console 206 utilizes over the LAN 236 and/or the IP Network 214 may behave differently depending on the user configurable QoS tagging setting. This allows the user to experiment with different settings to improve QoS for the specific connected nodes and links for the game console 206.

Figure 3:
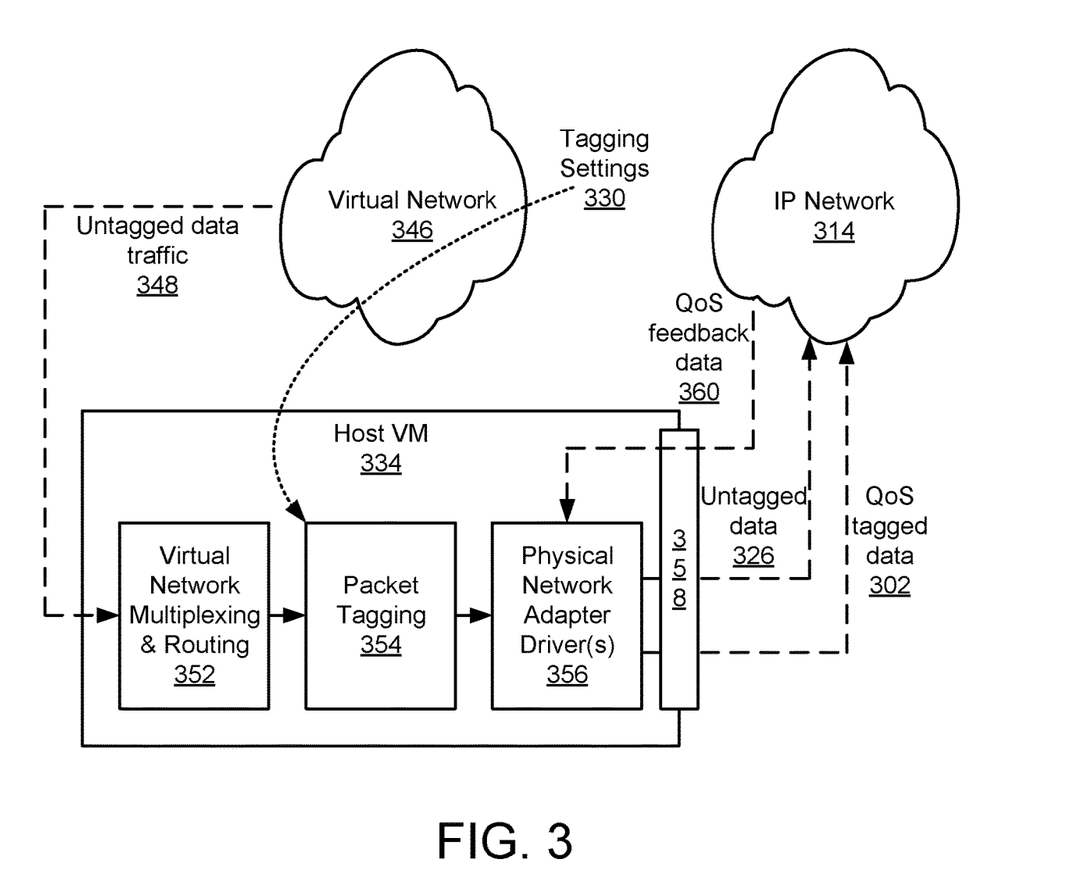
FIG. 3 illustrates an example host virtual machine that applies QoS packet tagging for latency-sensitive data flows outbound from the host virtual machine.

FIG. 3 illustrates an example host virtual machine 334 that applies QoS packet tagging for latency-sensitive data flows outbound from the host virtual machine 334. The host virtual machine 334 forms part of a game console operating system (OS) (not shown, see e.g., OS 238 of FIG. 2) for a game console (not shown, see e.g., game console 206 of FIG. 2) stored in memory (not shown, see e.g., memory 404 of FIG. 4) and executed using one or more processors (not shown, see e.g., processors 402 of FIG. 4). As the game console is a specialized computing device, it may run several virtual machines (VMs) simultaneously (e.g., the Host VM 234, a System VM (not shown, see e.g., System VM 240 of FIG. 2), and a Game VM (not shown, see e.g., Game VM 242 of FIG. 2)), each of which handles different operational areas of the game console, but when combined makes the VMs appear as one OS to IP Network 314. The IP Network 314 may be as described above with reference to IP Network 114 of FIG. 1.

The Host VM 334 is the primary OS for the game console and is responsible for managing the other VMs (e.g., the System VM and the Game VM), providing drivers for hardware components, applying QoS tagging, and so on. In an example implementation, the System VM provides the main visual and interactive layer of the game console to the user and the Game VM is used exclusively to run gaming titles. Other VMs may be present and also running within the game console to handle distinct operational areas of the game console.

In order to function together, the VMs (other than the Host VM 334) treat outbound/inbound data as communicated over a virtual network 346 to/from the Host VM 334. As all the VMs (including the Host VM 334) are running on the same hardware set, the virtual network 346 is merely an internal communication protocol that formats outbound/inbound data packets as if they were being transmitted over an actual communication network between the Host VM 334 and any other VMs running within the game console.

The VMs (other than the Host VM 334) generate outbound untagged data traffic 348, which may include a variety of data types, such as gaming data, videoconferencing data, voice-only data, text data, bulk data transfers, and game console metrics. Some of the outbound untagged data traffic 348 may be more sensitive to delays caused by data congestion and resulting queuing and/or drops of data packets than other outbound untagged data traffic 348. However, all outbound untagged data traffic 348 is sent out over the virtual network 346 to the Host VM 334 for further handling.

The Host VM 334 multiplexes traffic to and from multiple other VMs within the game console to a single external IP address. The Host VM 334 allows multiple other VMs to use a single external port, but multiple ports, some shared and some distinct may be used by the different VMs. This permits the Host VM 334 to reconfigure outbound network traffic to apply quality of service (QoS) values on data packets with no need for current application or game developers to take any QoS tagging action. The QoS values assigned to priority traffic may happen at the IPv4 and IPv6 packet headers for differentiated service codepoint (DSCP) tagging, and at the Wi-Fi packet header for wireless multimedia (WMA/I) prioritization over Wi-Fi. Backwards compatible games, such as those built for the Xbox® 360, were not designed and built with QoS tagging in mind. When an Xbox® 360 game runs on an Xbox® One or Series S|X, it operates as though it was running on Xbox® 360 hardware, while the Host VM 334 enables the older gaming title's network traffic to be tagged for prioritization, as appropriate.

Specifically, the incoming untagged data traffic 348 to the Host VM 334 is first handled by a Virtual Network Multiplexing & Routing application 352. The routing application 352 receives the incoming untagged data traffic 348, which may originate from multiple other VMs and multiplexes the incoming data into singular data stream to be handled by the Host VM 334. Packet Tagging application 354 regenerates the incoming data frames into outgoing data frames, each of which have header information that may include QoS tagging, as appropriate. The packet tagging may be applied automatically (e.g., via deep packet inspection), but pursuant to user tagging settings 330 (described in further detail below). Physical Network Adapter Driver(s) 356 receive the outgoing data frames (now QoS tagged data flow 302 and untagged data flow 326) and directs them outbound through a physical network adapter 358 (e.g., via one or more user datagram protocol (UDP) Ports, such as UDP Port 3074).

The Host VM 334 looks at the content of the incoming untagged data traffic 348 to determine its data type frame-by-frame. In some cases, the Host VM 334 is unaware of the contents of the incoming untagged data traffic 348, particularly if the data traffic 348 is encrypted and the Host VM 334 cannot obtain access the contents of the incoming untagged data traffic 348. In these cases, the Packet Tagging application 354 performs deep packet inspection on the data traffic 348 to determine its nature and assign a packet type to each inspected data packet. The deep packet inspection may include data payload size (e.g., Is the data payload size consistent with a particular type of data?), source (e.g., Did the packet come from a System VM, Game VM, or other VM?), rate (e.g., Does the incoming rate of similar data packets suggest a particular type of data?), header content (e.g., Does the header for the data traffic 348 suggest a particular type of data?), and so on.

Once the Packet Tagging application 354 identifies and assigns a packet type to each inspected data packet, it may consult a look-up take to determine if the identified and assigned packet type should be marked as prioritized with a QoS tag. Should the Packet Tagging application 354 match the identified packet type to a corresponding packet priority, the incoming data frames are regenerated into outgoing data frames, each of which have header information that includes QoS tagging (or not) per on the look-up table.

Prioritizing data traffic that is more sensitive to delays caused by data congestion and de-prioritizing data traffic that is less sensitive to delays caused by data congestion may be considered a quality of service (QoS) improvement to a user of the game console. For example, gaming data may be considered the most susceptible to data congestion delays as even small delays may cause noticeable jitter, latency, or lag in gameplay. Videoconferencing data and/or voice-only data (e.g., data that represents sound such as the human voice, such as VoIP data) may also be considered highly susceptible to data congestion delays as even small delays may cause delays that cause interference with conversation between humans.

In contrast, text data outbound is less susceptible to data congestion delays as a text-only conversation between humans is already delayed by virtue of human typing delay and a further delay between the typing delay may not be noticeable. Similarly, bulk data transfers may be buffered, and game console metrics may not be overtly monitored by a user. Thus, data congestion delays in transmitting these types of data are less or not at all noticeable by the user.

The Host VM 334 utilizes QoS header tagging to communicate to various nodes and links within an associated LAN (not shown, see e.g., LAN 236 of FIG. 2) and/or the IP Network 314 that data frames are to be prioritized and/or de-prioritized. Specifically, the Host VM 334 regenerates the data frames incoming from other VMs, some including QoS header tagging (illustrated as QoS tagged data 302) indicating that those outgoing data packets (organized as Ethernet frames) contain prioritized data. It follows that a lack of QoS header tagging in outbound data packets from the Host VM 334 (illustrated as untagged data 326) indicates that those data packets do not contain prioritized data and thus may be de-prioritized. While not shown, inbound data packets may include similar QoS header tagging, or a lack thereof, to indicate such data frames are to be prioritized and/or de-prioritized in their communication to the game console from another game console or elsewhere over one or more LANs and/or IP Network 314.

The QoS tagging indicates to computing nodes and links within the LAN and/or the IP network 314 that the QoS tagged data 302 is to be prioritized over the untagged data 326. This results in less queueing and fewer drops of the QoS tagged data 302 as compared to the untagged data 326. As a result, the QoS tagged data 302 flows faster outbound from the game console to its destination than the untagged data 326, all else being equal.

In some implementations, the QoS tagging may be user configurable. For example, a user may interact with the game console via a game controller (not shown) and use the game controller to access and configure tagging settings 330 for the game console within a VM user interface. The user's selected tagging settings 330 configuration flows to the Host VM 334 to affect how the Packet Tagging application 354 implements QoS tagging, if at all. In an example implementation, the user may be able to select between no QoS tagging, WMM only QoS tagging, DSCP only QoS tagging, and both WMM and DSCP tagging. Other implementations may utilize fewer options (e.g., only one available type of tagging) or a greater number of options (e.g., if additional tagging methods beyond WMM/DSCP are available). In various implementations, the specific nodes and links that the game console utilizes over the LAN and/or the IP Network 314 may behave differently depending on the user configurable QoS tagging setting. This allows the user to experiment with different settings to optimize QoS for the specific connected nodes and links for the game console.

In some implementations, feedback is provided back to the Host VM 334 from the IP Network 314 in terms of whether and what percentage of the QoS tagged data 302 made it to its destination, whether and what percentage of the QoS tagged data 302 maintained its QoS tags to its destination, and how much faster the QoS tagged data 302 was communicated to its destination as compared to the untagged data. This feedback is referred to herein as QoS feedback data 360 and may be used to inform the user as to the efficacy of the current QoS tagging settings 330.

In an example implementation, the Teredo networking standard is used to test the success of QoS tagging by the Host VM 334. In one implementation, Teredo is used for for network address translation (NAT) type detection. In another implementation, Teredo QoS servers are used for measuring network performance, and that traffic is tagged if the user enables QoS tagging. For example, some outbound data packets are sent to a Teredo server and the Teredo server sends the packets back to the Host VM 334 with an indicator of LAN performance. If no packets are returned, the NAT type is shown as unavailable, or other errors are returned; the gaming device displays a notice to the user via the System VM that the current QoS tagging settings 330 are ineffective (or counter-productive).

In some implementations, the gaming device may further display a "Help URL" to instruct the user to change the QoS tagging settings 330 if the current QoS tagging settings 330 are ineffective (or counter-productive). The QoS feedback data 360 further functions as a user feedback loop that informs the user if QoS tagging was unsuccessful at reaching an endpoint. That being the case, the user is the instructed to try different QoS tagging settings 330. Once QoS tagging settings 330 are optimized to the LAN and IP Network 314 connections specific to the game console, it should continue to work similar for all the untagged data traffic 348 incoming to the Host VM 334 (e.g., it may work for all gaming titles run on a Game VM).

Figure 4:
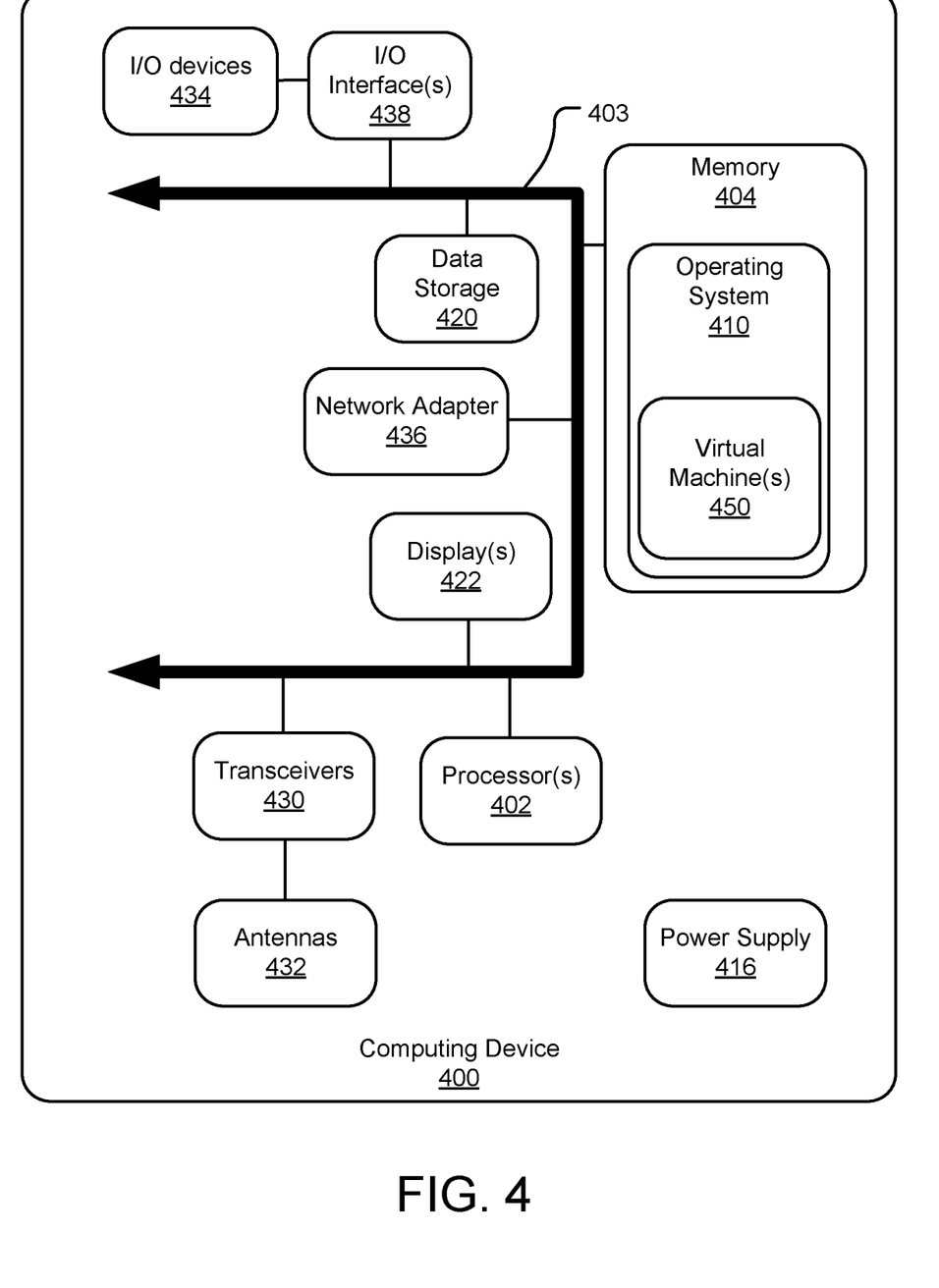
FIG. 4 illustrates example hardware and software that can be useful in implementing the described technology in a computing device.

FIG. 4 illustrates example hardware and software that can be useful in implementing the described technology in a computing device 400. The computing devices disclosed herein may be remote control devices and/or physically controlled devices and are network-connected and/or network-capable devices and may be client devices, such as game consoles, laptops, mobile devices, desktops, tablets, server/cloud devices, internet-of-things devices, electronic accessories, or other electronic computing devices, for example.

The computing device 400 includes a system board upon which a variety of microelectronic components for the device are attached and interconnected via a communication backbone 403. For example, the system board may include one or more processors 402 (e.g., discrete or integrated microelectronic chips and/or separate but integrated processor cores, including but not limited to central processing units (CPUs) and graphic processing units (GPUs)) and at least one memory device 404, which may be integrated into systems or chips of the device. The computing device 400 may also include data storage 420 (e.g., a flash or hard disk drive), one or more display(s) 422, and other input/output (I/O) devices 434. The I/O devices 434 may permit a user to may enter commands and information (e.g., via a game controller, keyboard, or mouse). These and other input devices may be coupled to the computing device 400 by one or more I/O interfaces 438, such as a serial port interface, parallel port, and/or universal serial bus (USB).

The memory device(s) 404 and/or the storage media 420 may include one or both of volatile memory (e.g., random-access memory (RAM)) and non-volatile memory (e.g., flash memory or magnetic storage). An operating system 410, such as one of the varieties of the Microsoft Windows® operating system including one or more virtual machines (VMs) 450, such as System VM, a Game VM, and a Host VM, resides in the memory device(s) 404 and/or the storage media 420 and is executed by at least one of the processor(s) 402, although other operating systems and/or VMs may be employed. Other software applications may also be loaded in the memory device(s) 404 and/or the storage media 420 and executed within the operating system 410 by at least one of the processor(s) 402.

The computing device 400 may further include a (or be connected to an external) power supply 416, which is powered by one or more batteries or other power sources and provides power to the computing device 400. The power supply 416 may also be connected to an external power source that overrides or recharges the batteries.

The computing device 400 may further include one or more communication transceivers 430, which may be connected to one or more antenna(s) 432 to provide network connectivity (e.g., mobile phone network, Wi-Fi®, Bluetooth®) to one or more other servers and/or client devices (e.g., mobile devices, desktop computers, or laptop computers) within a wireless network. The computing device 400 may further include a network adapter 436, which is a type of communication interface. The computing device 400 may use the network adapter 436 and any other types of communication devices for establishing connections over a data network, such as a wide-area network (WAN such as the IP Networks disclosed herein) or local-area network (LAN). The network connections shown are exemplary and that other communication devices and means for establishing a communications links between computing devices and their respective LAN/WAN network(s) and/or IP Network(s).

The computing devices disclosed herein may include a variety of tangible computer-readable storage media (e.g., the memory device(s) and the storage media device(s)) and intangible computer-readable communication signals. Tangible computer-readable storage can be embodied by any available media that can be accessed by the computing devices and includes both volatile and non-volatile storage media, as well as removable and non-removable storage media implemented in any method or technology for storage of information such as computer readable instructions, data structures, program modules or other data. Tangible computer-readable storage media includes, but is not limited to, RAM, read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other tangible medium which can be used to store the desired information and which can be accessed by the computing devices. Tangible computer-readable storage media excludes intangible communications signals.

Intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio-frequency (RF), infrared (IR), and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

Figure 5:
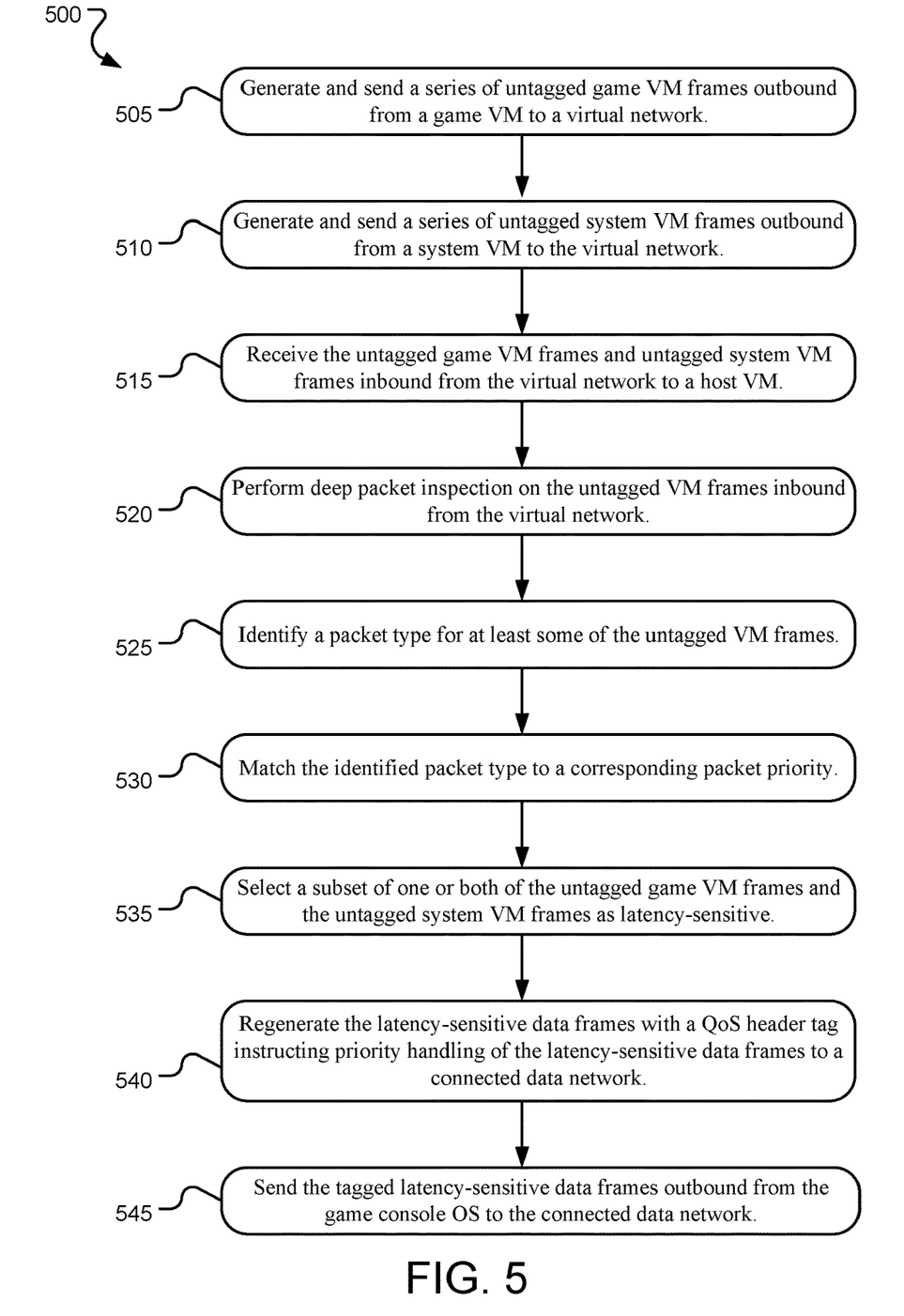
FIG. 5 illustrates example operations for adopting QoS packet tagging for latency-sensitive data flows outbound from a game console.

FIG. 5 illustrates example operations 500 for adopting QoS packet tagging for latency-sensitive data flows outbound from a game console. Operations 500 are appliable to tagging latency-sensitive packets generated within a game console OS or other operating systems for other computing devices. The game console OS (or other computing device OS) includes two or more VMs running in parallel (e.g., a System VM, a Game VM, and a Host VM). A first generating operation 505 generates and sends a series of untagged game VM frames outbound from a game VM to a virtual network within the game console OS. A second generating operation 510 generates and sends a series of untagged system VM frames outbound from a system VM to the virtual network within the game console OS. The untagged game VM frames and the untagged system VM frames may be prioritized or de-prioritized using the QoS packet tagging mechanisms described herein.

A receiving operation 515 receives the untagged game VM frames and untagged system VM frames inbound from the virtual network to a host VM within the game console OS. A performing operation 520 performs deep packet inspection on the untagged game VM frames and untagged system VM frames inbound from the virtual network within the host VM. An identifying operation 525 identifies a packet type for at least some of the untagged game VM frames and untagged system VM frames within the host VM using the deep packet inspection. A matching operation 530 matches the identified packet type to a corresponding packet priority within the host VM, in some cases, using a look-up table.

A selecting operation 535 selects a subset of one or both of the untagged game VM frames and the untagged system VM frames as latency-sensitive. In various implementations, the selecting operation 535 is based on the matched packet priority in matching operation 530. A regenerating operation 540 regenerates the latency-sensitive data frames within the host VM with a QoS header tag instructing priority handling of the latency-sensitive data frames to a connected data network. In various implementations, the header tag instructing priority handling of the latency-sensitive data frames is marked using one or both of WMM and DSCP tagging. A sending operation 545 sends the tagged latency-sensitive data frames outbound from the game console OS to the connected data network.

Figure 6:
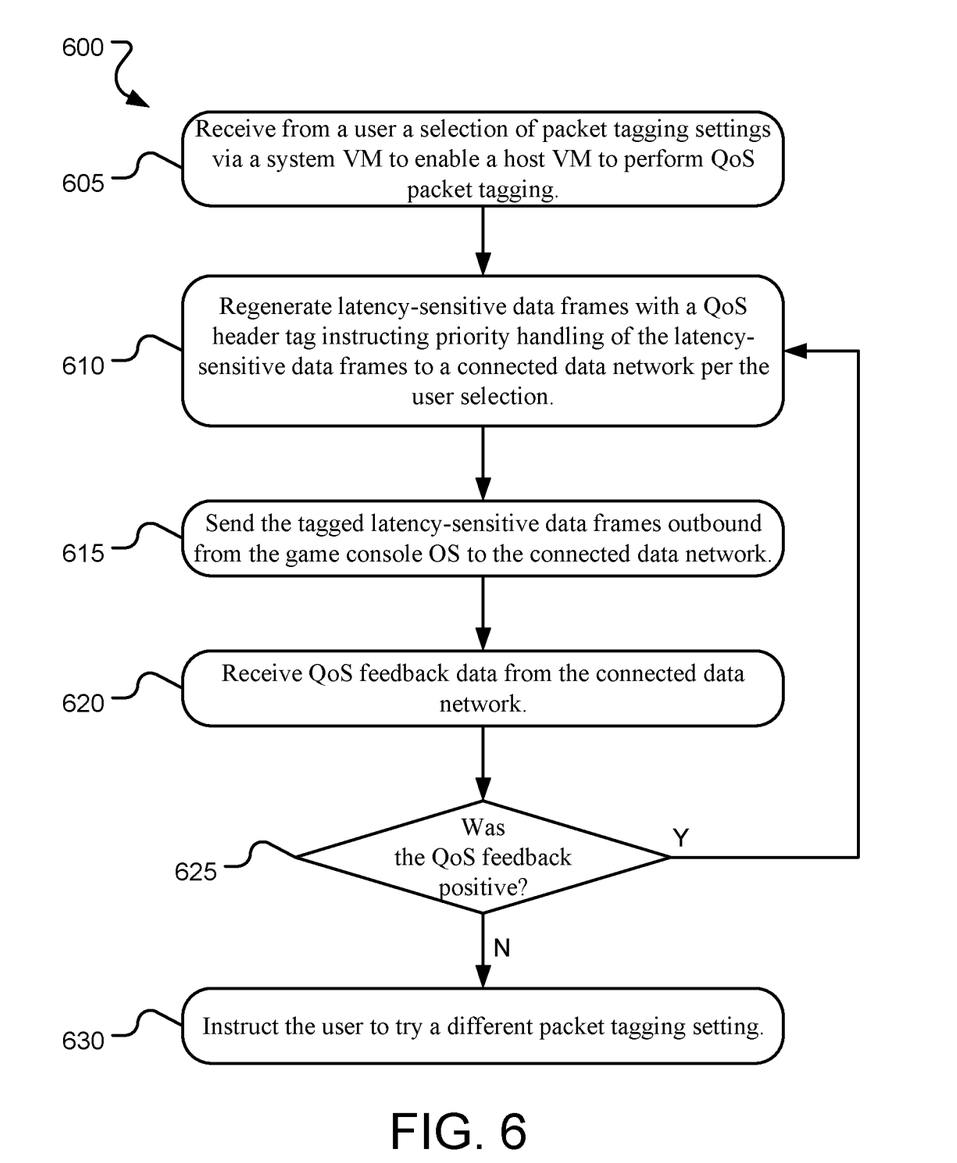
FIG. 6 illustrates further example operations for adopting QoS packet tagging for latency-sensitive data flows outbound from a game console.

FIG. 6 illustrates further example operations 600 for adopting QoS packet tagging for latency-sensitive data flows outbound from a game console. A receiving operation 605 receives from a user a selection of packet tagging settings via the system VM to enable the host VM to perform selection and regeneration operations, such as selecting operation 535 and regenerating operation 540 of FIG. 5. In some implementations, the packet tagging settings can be individually selectable for different packet types. For example, packet tagging could be enabled or disabled at the IP layer, Wi-Fi layer, and/or Ethernet layer independently. Further, different packet types may have different values assigned to distinguish between the packet types and apply packet tagging specific to various packet types.

Similar to regenerating operation 540 of FIG. 5, a regenerating operation 610 regenerates latency-sensitive data frames within the host VM with a QoS header tag instructing priority handling of the latency-sensitive data frames to a connected data network. In various implementations, the header tag instructing priority handling of the latency-sensitive data frames is marked using one or both of WMM and DSCP tagging.

A sending operation 615 sends the tagged latency-sensitive data frames outbound from the game console OS to the connected data network. A receiving operation 620 receiving QoS feedback data back from the connected data network. The QoS feedback data may be used to inform the user as to the efficacy of the user's current QoS tagging settings. A decision operation 625 determines if the QoS feedback data is positive (e.g., the user's current QoS tagging settings are functioning at least adequately). If so, the regenerating operation 610 and following operations repeat with the user's current QoS tagging settings. If the decision operation 625 determines that the QoS feedback data is not positive (e.g., the user's current QoS tagging settings are functioning less than adequately), instructing operation 630 instructs the user to try a different packet tagging setting at the system VM.

The presently disclosed technology includes, for example, a game console comprising memory, one or more processors, and a game console operating system (OS). The OS comprises a game virtual machine (VM) executable by the one or more processors, the game VM to generate and send a series of untagged game VM frames outbound to a virtual network; a system VM executable by the one or more processors, the system VM to generate and send a series of untagged system VM frames outbound to the virtual network; and a host VM executable by the one or more processors. The host VM is to receive the untagged game VM frames and the untagged system VM frames inbound from the virtual network; select a subset of one or both of the untagged game VM frames and the untagged system VM frames as latency-sensitive; regenerate the latency-sensitive data frames with a quality of service (QoS) header tag instructing priority handling of the latency-sensitive data frames to a connected data network; and send the tagged latency-sensitive data frames outbound to the connected data network.

In the presently disclosed technology, for example, the host VM is further to perform deep packet inspection on the untagged game VM frames and untagged system VM frames inbound from the virtual network; identify a packet type for at least some of the untagged game VM and untagged system VM frames; and match the identified packet type to a corresponding packet priority, wherein the selection of untagged game VM frames and the untagged system VM frames as latency-sensitive is based on the matched packet priority.

In the presently disclosed technology, for example, the deep packet inspection is performed without access to contents of the untagged game VM frames and untagged system VM frames inbound from the virtual network.

In the presently disclosed technology, for example, the header tag instructing priority handling of the latency-sensitive data frames is marked using one or both of wireless multimedia (WMM) and differentiated services code point (DSCP) tagging.

In the presently disclosed technology, for example, the system VM is further to: receive from a user a selection of packet tagging settings to enable the host VM to perform the selection and regeneration operations.

In the presently disclosed technology, for example, the host VM is further to receive QoS feedback data from the connected data network.

In the presently disclosed technology, for example, the system VM instructs the user to try a different packet tagging setting responsive to receipt of the QoS feedback data at the host VM.

The presently disclosed technology includes, for example, a method for tagging latency-sensitive packets generated within a game console operating system (OS). The method comprises generating and sending a series of untagged game virtual machine (VM) frames outbound from a game VM to a virtual network within the game console OS; generating and sending a series of untagged system VM frames outbound from a system VM to the virtual network within the game console OS; receiving the untagged game VM frames and the untagged system VM frames inbound from the virtual network to a host VM within the game console OS; selecting a subset of one or both of the untagged game VM frames and the untagged system VM frames as latency-sensitive; regenerating the latency-sensitive data frames within the host VM with a quality of service (QoS) header tag instructing priority handling of the latency-sensitive data frames to a connected data network; and sending the tagged latency-sensitive data frames outbound from the game console OS to the connected data network.

The presently disclosed technology further includes, for example, performing deep packet inspection on the untagged game VM frames and untagged system VM frames inbound from the virtual network within the host VM; identifying a packet type for at least some of the untagged game VM frames and untagged system VM frames within the host VM; and matching the identified packet type to a corresponding packet priority within the host VM, wherein the selection of untagged game VM frames and the untagged system VM frames as latency-sensitive is based on the matched packet priority.

In the presently disclosed technology, for example, the deep packet inspection is performed without access to contents of the untagged game VM frames and untagged system VM frames inbound from the virtual network.

In the presently disclosed technology, for example, the header tag instructing priority handling of the latency-sensitive data frames is marked using one or both of wireless multimedia (WMM) and differentiated services code point (DSCP) tagging.

The presently disclosed technology further includes, for example, receiving from a user a selection of packet tagging settings via the system VM to enable the host VM to perform the selection and regeneration operations.

The presently disclosed technology further includes, for example, receiving QoS feedback data from the connected data network.

The presently disclosed technology further includes, for example, instructing the user to try a different packet tagging setting at the system VM responsive to receipt of the QoS feedback data at the host VM.

The presently disclosed technology includes, for example, one or more computer-readable storage media encoding computer-executable instructions for executing on a computer system a computer process for tagging latency-sensitive packets generated within a game console operating system (OS). The computer process comprises generating and sending a series of untagged game virtual machine (VM) frames outbound from a game VM to a virtual network within the game console OS; generating and sending a series of untagged system VM frames outbound from a system VM to the virtual network within the game console OS; receiving the untagged game VM frames and the untagged system VM frames inbound from the virtual network to a host VM within the game console OS; selecting a subset of one or both of the untagged game VM frames and the untagged system VM frames as latency-sensitive; regenerating the latency-sensitive data frames within the host VM with a quality of service (QoS) header tag instructing priority handling of the latency-sensitive data frames to a connected data network; and sending the tagged latency-sensitive data frames outbound from the game console OS to the connected data network.

In the presently disclosed technology, for example, the computer process further comprises: performing deep packet inspection on the untagged game VM frames and untagged system VM frames inbound from the virtual network within the host VM; identifying a packet type for at least some of the untagged game VM frames and untagged system VM frames within the host VM; and matching the identified packet type to a corresponding packet priority within the host VM, wherein the selection of untagged game VM frames and the untagged system VM frames as latency-sensitive is based on the matched packet priority.

In the presently disclosed technology, for example, the header tag instructing priority handling of the latency-sensitive data frames is marked using one or both of wireless multimedia (WMM) and differentiated services code point (DSCP) tagging.

In the presently disclosed technology, for example, the computer process further comprises receiving from a user a selection of packet tagging settings via the system VM to enable the host VM to perform the selection and regeneration operations.

In the presently disclosed technology, for example, the computer process further comprises receiving QoS feedback data from the connected data network.

In the presently disclosed technology, for example, the computer process further comprises instructing the user to try a different packet tagging setting at the system VM responsive to receipt of the QoS feedback data at the host VM.

Some embodiments of the invention described herein are implemented as logical steps in one or more computer systems. The logical operations are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations described herein are referred to variously as operations, steps, objects, or modules. Furthermore, the logical operations may be performed in any order, adding or omitting operations as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A game console comprising:
   memory;
   one or more processors; and
   a game console operating system (OS) comprising:
     a game virtual machine (VM) executable by the one or more processors, the game VM to generate and send a series of untagged game VM frames outbound to a virtual network;
     a system VM executable by the one or more processors, the system VM to generate and send a series of untagged system VM frames outbound to the virtual network; and
     a host VM executable by the one or more processors, the host VM to:
       receive the untagged game VM frames and the untagged system VM frames inbound from the virtual network;
       select a subset of one or both of the untagged game VM frames and the untagged system VM frames as latency-sensitive;
       regenerate the latency-sensitive data frames with a quality of service (QoS) header tag instructing priority handling of the latency-sensitive data frames to a connected data network; and
       send the tagged latency-sensitive data frames outbound to the connected data network.

2. The game console of claim 1, wherein the host VM is further to:
   perform deep packet inspection on the untagged game VM frames and untagged system VM frames inbound from the virtual network;
   identify a packet type for at least some of the untagged game VM frames and untagged system VM frames; and
   match the identified packet type to a corresponding packet priority, wherein the selection of untagged game VM frames and the untagged system VM frames as latency-sensitive is based on the matched packet priority.

3. The game console of claim 2, wherein the deep packet inspection is performed without access to contents of the untagged game VM frames and untagged system VM frames inbound from the virtual network.

4. The game console of claim 1, wherein the header tag instructing priority handling of the latency-sensitive data frames is marked using one or both of wireless multimedia (WMM) and differentiated services code point (DSCP) tagging.

5. The game console of claim 1, wherein the system VM is further to:
   receive from a user a selection of packet tagging settings to enable the host VM to perform the selection and regeneration operations.

6. The game console of claim 5, wherein the host VM is further to receive QoS feedback data from the connected data network.

7. The game console of claim 6, wherein the system VM instructs the user to try a different packet tagging setting responsive to receipt of the QoS feedback data at the host VM.

8. A method for tagging latency-sensitive packets generated within a game console operating system (OS), the method comprising:
generating and sending a series of untagged game virtual machine (VM) frames outbound from a game VM to a virtual network within the game console OS;
generating and sending a series of untagged system VM frames outbound from a system VM to the virtual network within the game console OS;
receiving the untagged game VM frames and the untagged system VM frames inbound from the virtual network to a host VM within the game console OS;
selecting a subset of one or both of the untagged game VM frames and the untagged system VM frames as latency-sensitive;
regenerating the latency-sensitive data frames within the host VM with a quality of service (QoS) header tag instructing priority handling of the latency-sensitive data frames to a connected data network; and
sending the tagged latency-sensitive data frames outbound from the game console OS to the connected data network.

9. The method of claim 8, further comprising:
performing deep packet inspection on the untagged game VM frames and untagged system VM frames inbound from the virtual network within the host VM;
identifying a packet type for at least some of the untagged game VM frames and untagged system VM frames within the host VM; and
matching the identified packet type to a corresponding packet priority within the host VM, wherein the selection of untagged game VM frames and the untagged system VM frames as latency-sensitive is based on the matched packet priority.

10. The method of claim 9, wherein the deep packet inspection is performed without access to contents of the untagged game VM frames and untagged system VM frames inbound from the virtual network.

11. The method of claim 8, wherein the header tag instructing priority handling of the latency-sensitive data frames is marked using one or both of wireless multimedia (WMM) and differentiated services code point (DSCP) tagging.

12. The method of claim 8, further comprising:
receiving from a user a selection of packet tagging settings via the system VM to enable the host VM to perform the selection and regeneration operations.

13. The method of claim 12, further comprising:
receiving QoS feedback data from the connected data network.

14. The method of claim 13, further comprising:
instructing the user to try a different packet tagging setting at the system VM responsive to receipt of the QoS feedback data at the host VM.

15. One or more computer-readable storage media encoding computer-executable instructions for executing on a computer system a computer process for tagging latency-sensitive packets generated within a game console operating system (OS), the computer process comprising:
generating and sending a series of untagged game virtual machine (VM) frames outbound from a game VM to a virtual network within the game console OS;
generating and sending a series of untagged system VM frames outbound from a system VM to the virtual network within the game console OS;
receiving the untagged game VM frames and the untagged system VM frames inbound from the virtual network to a host VM within the game console OS;
selecting a subset of one or both of the untagged game VM frames and the untagged system VM frames as latency-sensitive;
regenerating the latency-sensitive data frames within the host VM with a quality of service (QoS) header tag instructing priority handling of the latency-sensitive data frames to a connected data network; and
sending the tagged latency-sensitive data frames outbound from the game console OS to the connected data network.

16. The computer-readable storage media of claim 15, wherein the computer process further comprises:
performing deep packet inspection on the untagged game VM frames and untagged system VM frames inbound from the virtual network within the host VM;
identifying a packet type for at least some of the untagged game VM frames and untagged system VM frames within the host VM; and
matching the identified packet type to a corresponding packet priority within the host VM, wherein the selection of untagged game VM frames and the untagged system VM frames as latency-sensitive is based on the matched packet priority.

17. The computer-readable storage media of claim 15, wherein the header tag instructing priority handling of the latency-sensitive data frames is marked using one or both of wireless multimedia (WMM) and differentiated services code point (DSCP) tagging.

18. The computer-readable storage media of claim 15, wherein the computer process further comprises:
receiving from a user a selection of packet tagging settings via the system VM to enable the host VM to perform the selection and regeneration operations.

19. The computer-readable storage media of claim 18, wherein the computer process further comprises:
receiving QoS feedback data from the connected data network.

20. The computer-readable storage media of claim 19, wherein the computer process further comprises:
instructing the user to try a different packet tagging setting at the system VM responsive to receipt of the QoS feedback data at the host VM.

* * * * *